United States Patent
Liu et al.

(10) Patent No.: US 9,395,848 B2
(45) Date of Patent: Jul. 19, 2016

(54) OPTICAL TOUCH CONTROL SYSTEMS AND METHODS THEREOF

(71) Applicant: Quanta Computer Inc., Kuei Shan Hsiang, Tao Yuan Shien (TW)

(72) Inventors: Yun-Cheng Liu, Tao Yuan Shien (TW); Chien-Hung Lin, Tao Yuan Shien (TW)

(73) Assignee: QUANTA COMPUTER INC., Kuei Shan Hsiang, Tao Yuan Shien (TW)

( * ) Notice: Subject to any disclaimer, the term of this patent is extended or adjusted under 35 U.S.C. 154(b) by 0 days.

(21) Appl. No.: 14/336,126

(22) Filed: Jul. 21, 2014

(65) Prior Publication Data
US 2015/0317022 A1    Nov. 5, 2015

(30) Foreign Application Priority Data
Apr. 30, 2014    (TW) .............................. 103115480 A (51) Int. Cl.
| | |
|---|---|
| G06F 3/042 | (2006.01) |
| G06F 3/041 | (2006.01) |
| G06F 3/01 | (2006.01) |
| G06F 1/16 | (2006.01) |

(52) U.S. Cl.
CPC .............. *G06F 3/042* (2013.01); *G06F 1/1686* (2013.01); *G06F 3/017* (2013.01); *G06F 3/0412* (2013.01); *G06F 3/0416* (2013.01); *G06F 3/0421* (2013.01)

(58) Field of Classification Search
CPC ..... G06F 3/042; G06F 3/0421; G06F 3/0412; G06F 3/0416; G06F 1/1686
USPC ......................................... 345/175; 178/18.09
See application file for complete search history.

(56) References Cited

U.S. PATENT DOCUMENTS

| | | | | |
|---|---|---|---|---|
| 2009/0058833 | A1* | 3/2009 | Newton | G06F 3/0421 345/175 |
| 2009/0219256 | A1* | 9/2009 | Newton | G06F 3/0421 345/173 |
| 2009/0278794 | A1* | 11/2009 | McReynolds et al. | G06F 3/0421 345/156 |
| 2010/0321309 | A1* | 12/2010 | Lee | G06F 3/0421 345/173 |
| 2011/0026011 | A1* | 2/2011 | Onishi | G06F 3/0428 356/51 |
| 2011/0205186 | A1* | 8/2011 | Newton | G06F 3/0428 345/175 |

\* cited by examiner

*Primary Examiner* — Adam J Snyder
(74) *Attorney, Agent, or Firm* — McClure, Qualey & Rodack, LLP (57) ABSTRACT

An optical touch control system is disclosed, includes a display panel, first and second optical sensors, first and second light-emitting devices, and a controller. The first and second optical sensors are respectively disposed at opposite corners of the display panel. The first and second light-emitting devices are disposed on the first and second optical sensors, respectively. The controller turns off the first and second light-emitting devices and turns on the first optical sensor to obtain a first frame, only turns on the second light-emitting device and the first optical sensor to obtain a second frame, turns off the first and second light-emitting devices and turns on the second optical sensor to obtain a third frame, only turns on the first light-emitting device and the second optical sensor to obtain a fourth frame, and determines a gesture according to the first through the fourth frames.

6 Claims, 9 Drawing Sheets

OPTICAL TOUCH CONTROL SYSTEMS AND METHODS THEREOF

CROSS REFERENCE TO RELATED APPLICATIONS

This application claims priority of Taiwan Patent Application No. 103115480, filed on Apr. 30, 2014, and the entirety of which is incorporated by reference herein.

BACKGROUND OF THE INVENTION

1. Field of the Invention

The present invention relates to an input system, and in particular relates to an optical touch system.

2. Description of the Related Art

An optical touch control system can perform various touch control functions via a light-emitting transmitter and receiver. An input device which is adopted by a notebook computer and receives gesture inputs at short range is provided in the invention, allowing a user to operate a computer or perform a 2-dimensional touch control function by a gesture via two optical sensors.

BRIEF SUMMARY OF THE INVENTION

A detailed description is given in the following embodiments with reference to the accompanying drawings.

An embodiment of an optical touch control system is disclosed, including a display panel, a first optical sensor, a first light-emitting device, a second optical sensor, a second light-emitting device and a controller. The first optical sensor is disposed at a first corner of the display panel. The first light-emitting device is disposed on the first optical sensor and configured to emit a first light beam toward a first direction. The second optical sensor is disposed at a second corner of the display panel, wherein the second corner is opposite the first corner. The second light-emitting device is disposed on the second optical sensor and configured to emit a second light beam toward a second direction. The controller is configured to turn off the first and second light-emitting devices and turn on the first optical sensor to obtain a first frame, only turn on the second light-emitting device and turn on the first optical sensor to obtain a second frame, turn off the first and second light-emitting devices and turn on the second optical sensor to obtain a third frame, only turn on the first light-emitting device and turn on the second optical sensor to obtain a fourth frame, and determine a gesture according to the first, the second, the third, and the fourth frames.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
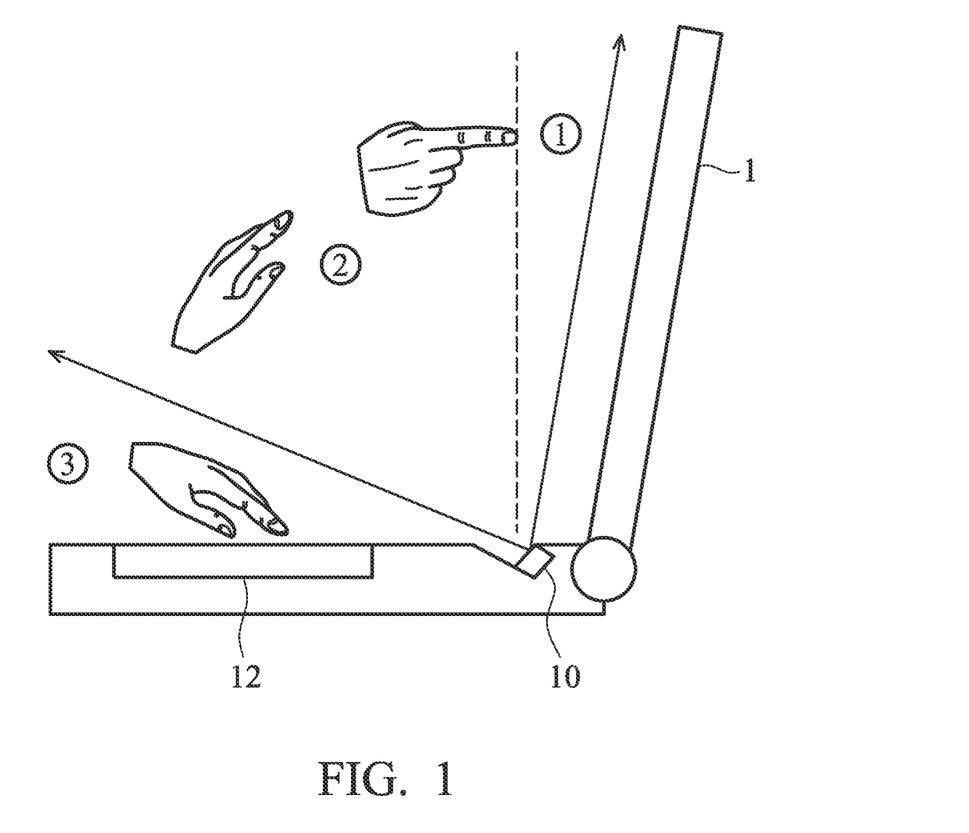
FIG. 1 illustrates an input interface according to an embodiment of the invention.

FIG. 1 illustrates an input interface according to an embodiment of the invention, including a notebook computer 1 which contains a keyboard 12 and optical sense circuits 10. An input sense field may be classified into a zone 1, zone 2 and zone 3. An input of a virtual touch panel may be detected from the zone 1. A 3D (3-dimensional) gesture input may be detected from the zone 2. A keyboard input may be detected from the zone 3.

Two optical sense circuits 10 are disposed at left and right bottom of the notebook computer 1, which monitor an intersectional detection area including the virtual touch panel, or the zone 1. The two optical sense circuits 10 are configured to monitor hand inputs of a user in the zones 1 and 2. When a hand of a user falls into the zone 3, the optical sense circuits 10 cannot detect the hand. The input interface may determine the different input types based on the zone in which a user input is detected. When hands are on the keyboard 12, the optical sense circuits 10 cannot detect the hands, thus a normal operation mode is determined. When a hand is present in the 3D gesture zone 2, a gesture mode is determined, in which a user may perform functions such as turning or browsing web pages by hand gestures. When a hand is present in the 2D touch panel zone 1, a touch control mode is determined, in which a user may perform functions such as selection by moving a finger on or into the virtual plane of the virtual touch panel.

Figure 2:
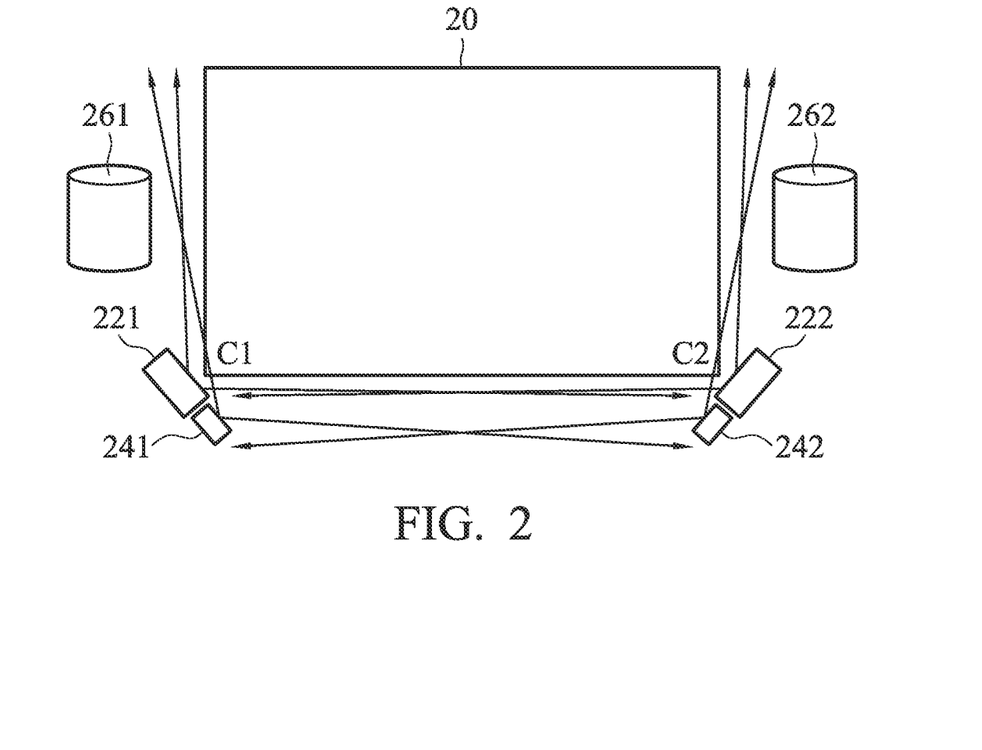
FIG. 2 illustrates a schematic diagram of an optical touch control system 2 according to an embodiment of the invention.

FIG. 2 illustrates a schematic diagram of an optical touch control system 2 according to an embodiment of the invention, incorporating the input interface in FIG. 1. The optical touch control system 2 includes a display panel 20, a left optical sense circuit which includes a left optical sensor 221 and a left light-emitting device 241, and a right optical sense circuit which includes a right optical sensor 222 and a right light-emitting device 242. A left background object 261 and a right background object 262 are present at the left and right of the display panel 20. The left background object 261 and the right background object 262 may be, for example, a kettle, a cup, a book, a wall, or other environmental objects. The display panel 20 may be a Liquid Crystal Display (LCD) or a Thin Film Transistor Liquid Crystal Display (TFT-LCD). The optical sensors 221 and 222 are disposed at a left corner C1 and a right corner C2 of the display panel 20, and may be an infrared sensor, an ultra violet sensor, a color sensor, or a Charged Coupled Device (CCD) image sensor, which converts a light signal into an electrical signal by a light sensor.

The light-emitting devices 241 and 242 may be a Light-Emitting Diode (LED), and respectively disposed on the optical sensors 221 and 222.

If while the optical sensor is monitoring a gesture, the light-emitting device on the same side of the monitoring optical sensor lights up, the environmental object 261 or 262 will become a lightened-up background. When the brightness of the background exceeds that of a finger, the optical sensor will fail to accurately determine the position of the finger when the fingers moving in the zone 2 or zone 3, causing misinterpretation of a gesture. For example, when the left optical sensors 221 is capturing a picture, the left light-emitting devices 241 lights up for illuminating the gesture control zone; or when the right optical sensors 222 is capturing a picture, the right light-emitting devices 242 lights up for illuminating the gesture control zone. In cases as such, and when the left background object 261 or the right background object 262 is a light-colored or reflective object, the brightness of the lightened-up background object will exceed that of a finger, causing the optic sensor to misinterpret a gesture.

The embodiment staggers the turn-on times of the light-emitting device and the optical sensor on the same side and concurrently turns on the light-emitting device and the optical sensor on the opposite sides. That is, when the left optical sensors 221 is capturing a picture, only the left light-emitting devices 241 lights up to illuminate the gesture control zone. The right background object 262 will not be illuminated due to the illuminating angle, and the fingers will be illuminated by the right light-emitting devices 242 against the darkened right background. Likewise, when the right optical sensors 222 is capturing a picture, only the right light-emitting devices 242 lights up to illuminate the gesture control zone, so that the left background object 261 will not be illuminated due to the illuminating angle, and the fingers will be illuminated by the left light-emitting devices 241 against the darkened left background. As a consequence, the background interference is prevented in a subsequent image processing stage.

Figure 6:
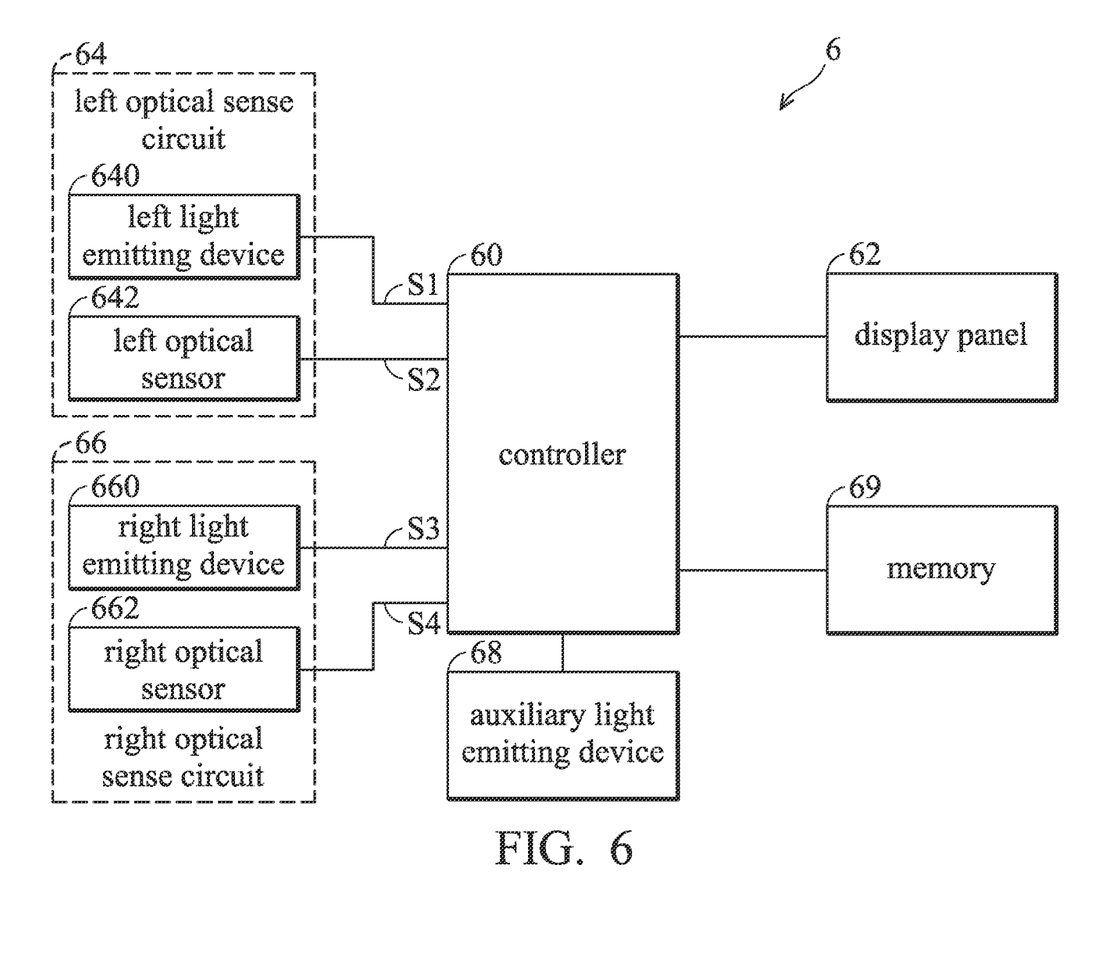
FIG. 6 illustrates a block diagram of an optical touch system 6 according to an embodiment of the invention.

Next please refer to FIG. 6, illustrating a block diagram of an optical touch system 6 according to an embodiment of the invention. The optical touch system 6 corresponds to the optical touch system 2 in FIG. 2. The optical touch system 6 includes a controller 60, a display panel 62, a left optical sense circuit 64 which includes a left light-emitting device 640 and a left optical sensor 642, a right optical sense circuit 66 which includes a right light-emitting device 660 and a right optical sensor 662, an auxiliary light-emitting device 68, and memory 69. The display panel 62, the left light-emitting device 640, the left optical sensor 642, the right light-emitting device 660, and the right optical sensor 662 in FIG. 6 respectively correspond to the display panel 20, the left light-emitting device 241, the left optical sensor 221, the right light-emitting device 242, and the right optical sensor 222 in FIG. 2, the functions and configurations thereof can find references in the preceding paragraphs for FIG. 2, explanations therefor are not repeated again here.

The controller 60 is configured to control operations of the display panel 62, the left optical sense circuit 64 which includes the left light-emitting device 640 and the left optical sensor 642, the right optical sense circuit 66 which includes the right light-emitting device 660 and the right optical sensor 662, the auxiliary light-emitting device 68 and the memory 69. The memory 69 stores program codes which serve to determine a gesture, and can be loaded onto the controller 60 after being powered on to sequentially retrieve an image frame sequence by operating the left light-emitting device 640, the left optical sensor 642, the right light-emitting device 660, and the right optical sensor 662, thereby determining a user gesture or a touch input under the gesture mode and the touch control mode. The auxiliary light-emitting device 68 is optional, serves to supply an auxiliary light source from a bottom edge of the display panel 62 for illuminating fingers. In the example of the optical touch control system 2, the auxiliary light-emitting device 68 is not required.

Figure 7:
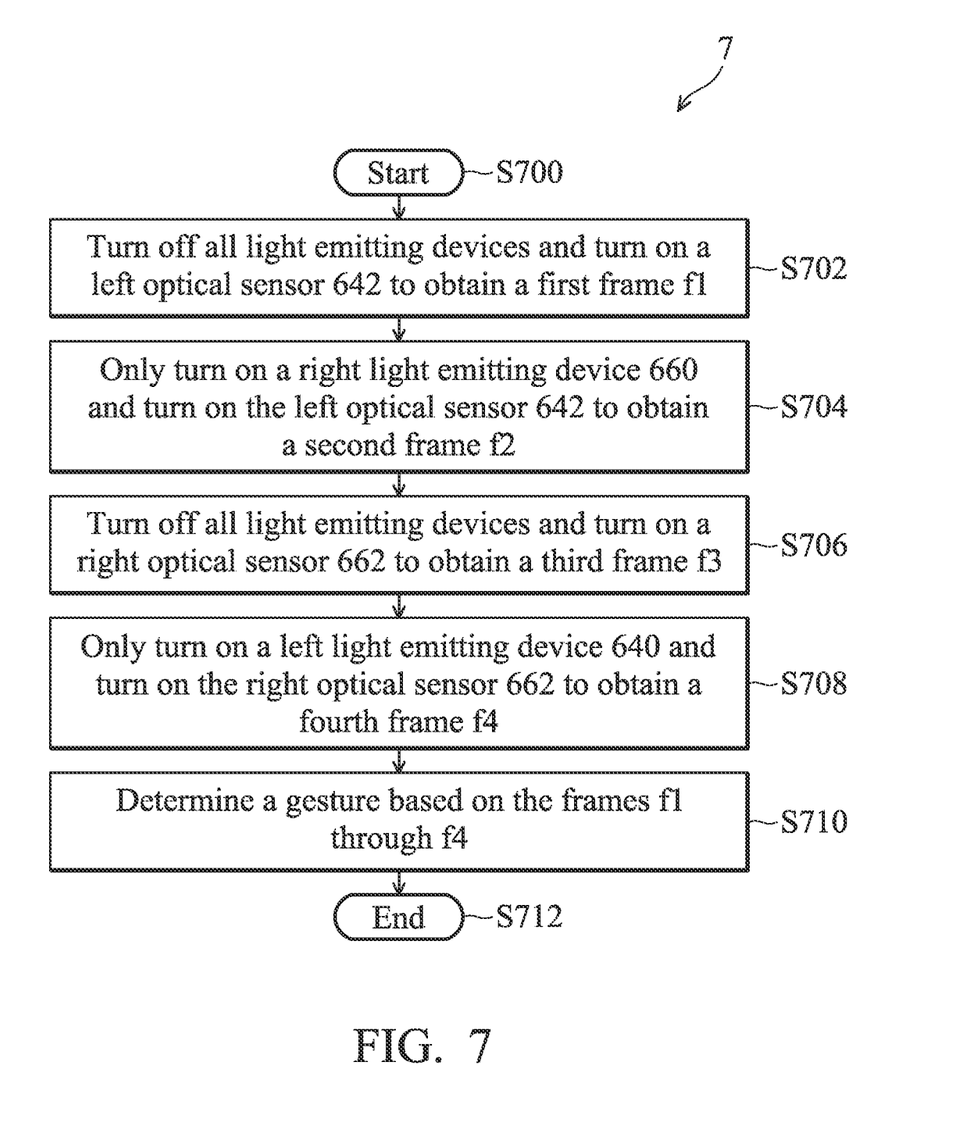
FIG. 7 is a flowchart of a gesture determination method 7 according to an embodiment of the invention.

A gesture determination method 7 in FIG. 7 may be adopted by the optical touch control systems 2 and 6, determining a gesture in the zones 1 and 2 in FIG. 1 without the background interference. The gesture determination method 7 may be implemented by program codes or circuits. Please refer to FIGS. 6 and 7. When the optical touch control system 6 turns on, the controller 60 may load the program codes or initiate the circuits which implement the gesture determination method 7, determining a user gesture (S700).

Initially, the controller 60 turns off all light-emitting devices and turns on the left optical sensor 642 to obtain a first frame f1 which contains image information observing the background and hand in the dark from the left (S702). The controller 60 then turns on the right light-emitting device 660 only and turns on the left optical sensor 642 to obtain a second frame f2 which contains image information observing the background in the dark and hand in the light from the left (S704). Next, the controller 60 may subtract the first frame f1 from the second frame f2 to retrieve image information from the left which removes the background in the dark and keeps the hand in the light.

Next, the controller 60 turns off all light-emitting devices and turns on the right optical sensor 662 to obtain a third frame f3 which contains image information observing the background and hand in the dark from the right (S706). The controller 60 then turns on the left light-emitting device 640 only and turns on the right optical sensor 662 to obtain a fourth frame f4 which contains image information observing the background in the dark and hand in the light from the right (S708). Then, the controller 60 may subtract the third frame f3 from the fourth frame f4 to retrieve image information from the right which removes the background in the dark and keeps the hand in the light.

Finally, the controller 60 determines the position and gesture of the hand based on the image information retrieved from the left and right calculated by the frames f1 through f4 (S710).

Although the embodiment in FIG. 7 retrieves the image information from the left then subsequently from the right to determine a gesture, in certain embodiments, the order of retrieving the image information may be firstly from the right then subsequently from the left. Moreover, in some embodiments, the steps of subtracting the first frame f1 from the second frame f2 and the third frame f3 from the fourth frame f4 to remove the backgrounds may be executed in Step S710. The gesture determination method 7 may be constantly and continuously run to determine gestures of a user when the optical touch system 6 turns on.

Figure 3:
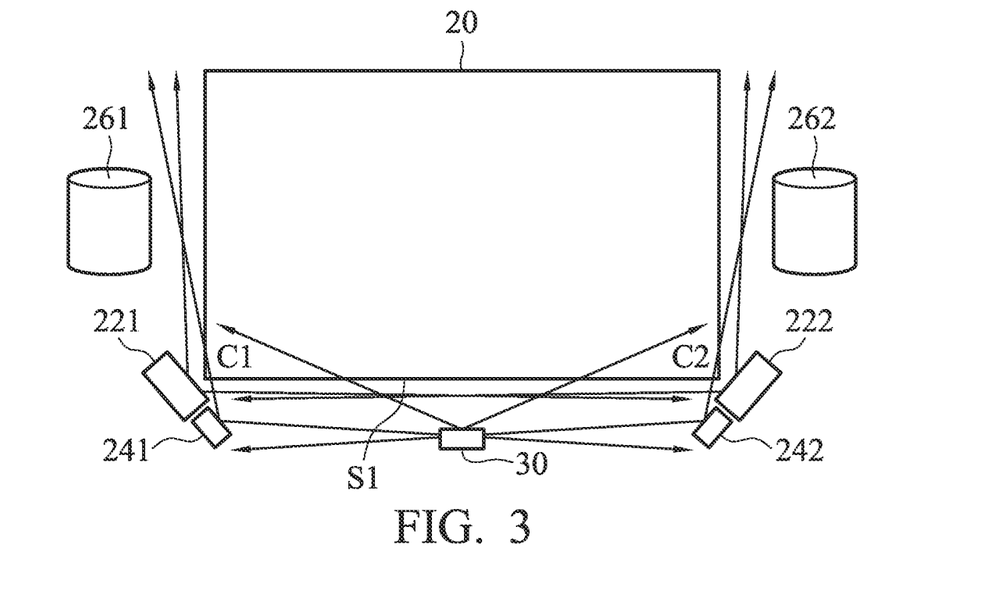
FIG. 3 is a schematic diagram of an optical touch control system 3 according another embodiment of the invention.

FIG. 3 is a schematic diagram of an optical touch control system 3 according another embodiment of the invention. The optical touch control system 3 is the same as the optical touch control system 2, except an auxiliary light-emitting device 30 is evenly disposed at the lower edge S1. The auxiliary light-emitting device 30 may be an LED which emits an auxiliary light upwards from below to increase image brightness of fingers when the fingers move close to the lower part of the display panel 20.

Figure 4:
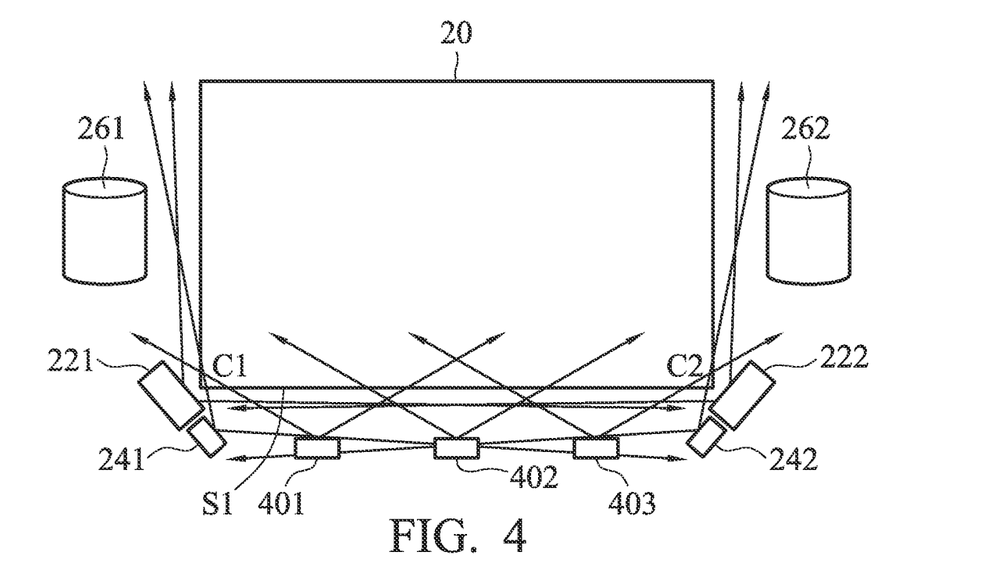
FIG. 4 is a schematic diagram of an optical touch control system 4 according another embodiment of the invention.

FIG. 4 is a schematic diagram of an optical touch control system 4 according another embodiment of the invention. The optical touch control system 4 is the same as the optical touch control system 2, except a plurality of auxiliary light-emitting devices 401, 412 and 403 are evenly disposed at a substantially center part of the lower edge S1. The auxiliary light-emitting devices 401, 412 and 403 may be LEDs which emit auxiliary light upwards from below to increase image brightness of fingers when the fingers move close to the lower part of the display panel 20.

Figure 5:
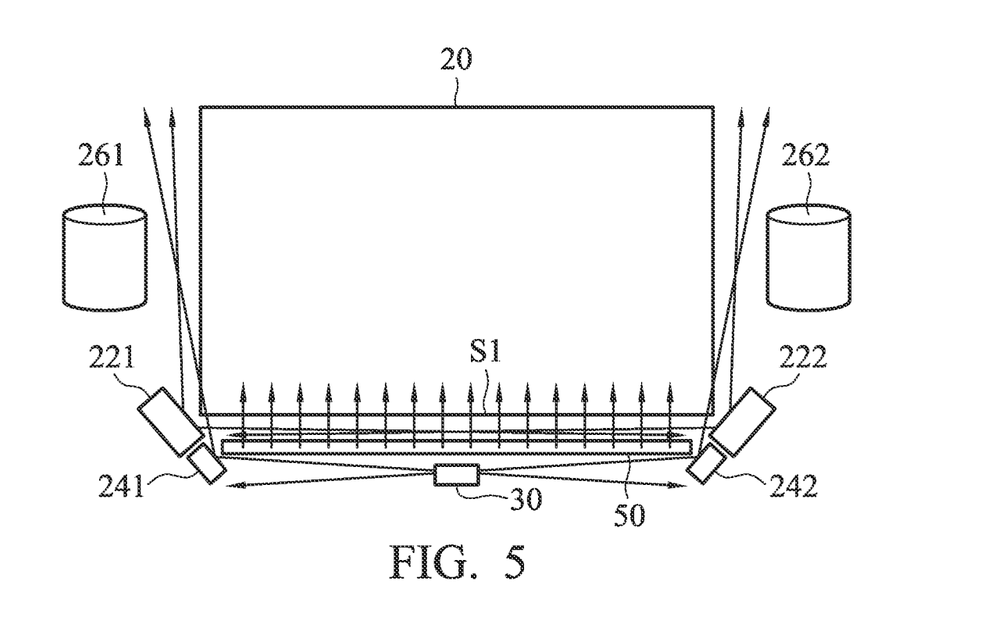
FIG. 5 is a schematic diagram of an optical touch control system 5 according another embodiment of the invention.

FIG. 5 is a schematic diagram of an optical touch control system 5 according another embodiment of the invention. The optical touch control system 5 is the same as the optical touch control system 3, except a light strip 50 is disposed along the lower edge S1. The light strip 50 receives the light from the light-emitting device 30, and generates light evenly along the lower edge S1 to increase image brightness of fingers when the fingers move close to the lower part of the display panel 20.

Figure 8:
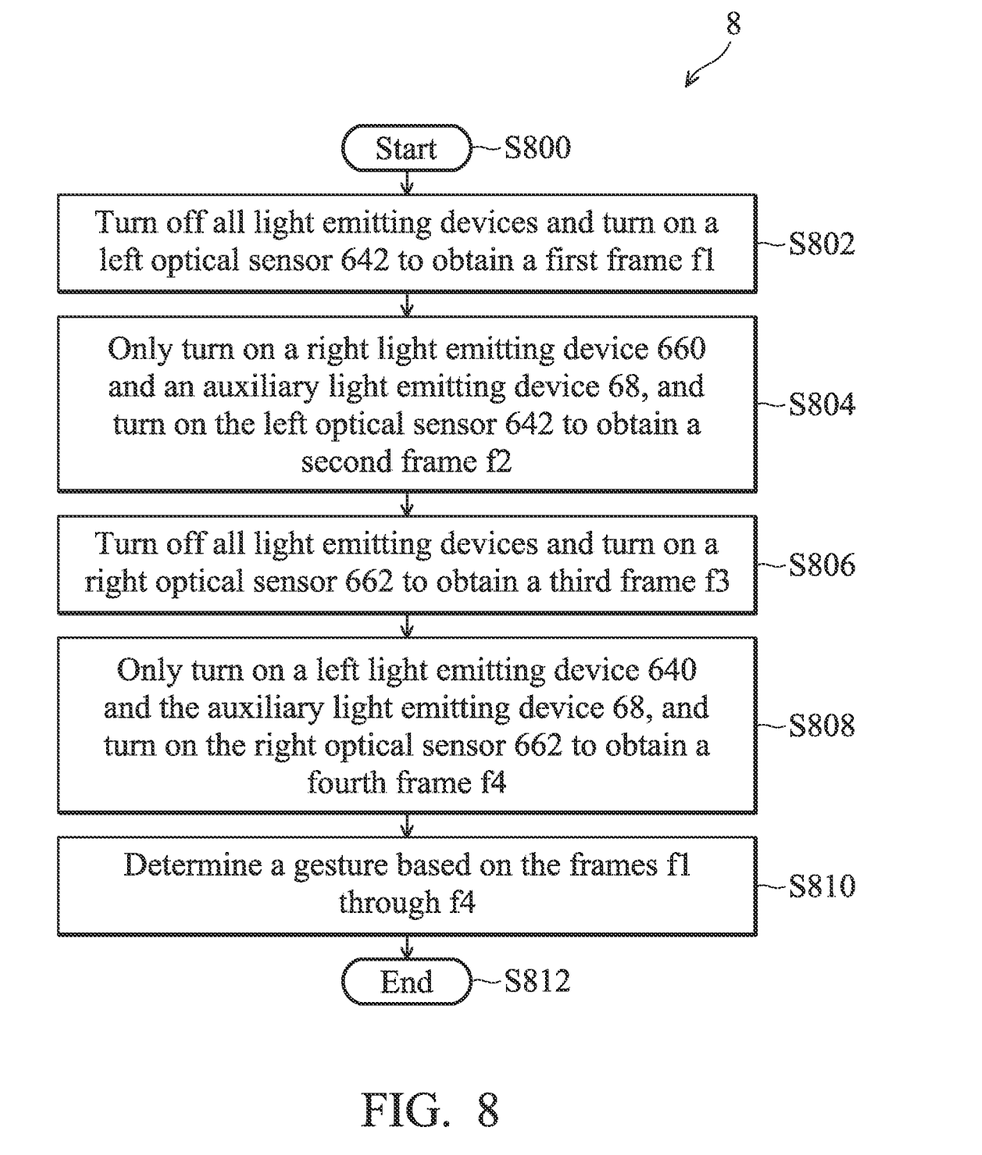
FIG. 8 is a flowchart of a gesture determination method 7 according to another embodiment of the invention.

The light touch control systems 3 through 5 in FIGS. 3 through 5 may adopt a gesture determination method 8 in FIG. 8, which determines gestures of a user without causing background interferences. The optical touch system 6 corresponds to the light touch control systems 3 through 5, wherein the auxiliary light-emitting device 30, the plurality of auxiliary light-emitting devices 401, 402 and 403, and the light strip 50 may correspond to the auxiliary light-emitting device 68. The following utilizes the optical touch system 6 to explain operations of the gesture determination method 8 in FIG. 8. The gesture determination method 8 may be implemented by program codes or circuits.

When the optical touch control system 6 turns on, the controller 60 may load the program codes or initiate the circuits which implement the gesture determination method 8 to determine a user gesture (S800).

Initially, the controller 60 turns off all light-emitting devices and turns on the left optical sensor 642 to obtain a first frame f1 which contains image information observing the background and hand in the dark from the left (S802). The controller 60 then turns on the right light-emitting device 660 and the auxiliary light-emitting device 68 only and turns on the left optical sensor 642 to obtain a second frame f2 which contains image information observing the background in the dark and hand in the light from the left (S804). Next, the controller 60 may subtract the first frame f1 from the second frame f2 to retrieve image information from the left which removes the background in the dark and keeps the hand in the light.

Next, the controller 60 turns off all light-emitting devices and turns on the right optical sensor 662 to obtain a third frame f3 which contains image information observing the background and hand in the dark from the right (S806). The controller 60 then turns on the left light-emitting device 640 and the auxiliary light-emitting device 68 only and turns on the right optical sensor 662 to obtain a fourth frame f4 which contains image information observing the background in the dark and hand in the light from the right (S808). Then, the controller 60 may subtract the third frame f3 from the fourth frame f4 to retrieve image information from the right which removes the background in the dark and keeps the hand in the light.

Finally, the controller 60 determines the position and gesture of the hand based on the image information retrieved from the left and right calculated by the frames f1 through f4 (S810).

Although the embodiment in FIG. 8 retrieves the image information from the left then subsequently from the right to determine a gesture, in certain embodiments, the order of retrieving the image information may be firstly from the right then subsequently from the left. Moreover, in some embodiments, the steps of subtracting the first frame f1 from the second frame f2 and the third frame f3 from the fourth frame f4 to remove the backgrounds may be executed in Step S810. The gesture determination method 8 may be constantly and continuously run to determine gestures of a user when the optical touch system 6 turns on.

Figure 9:
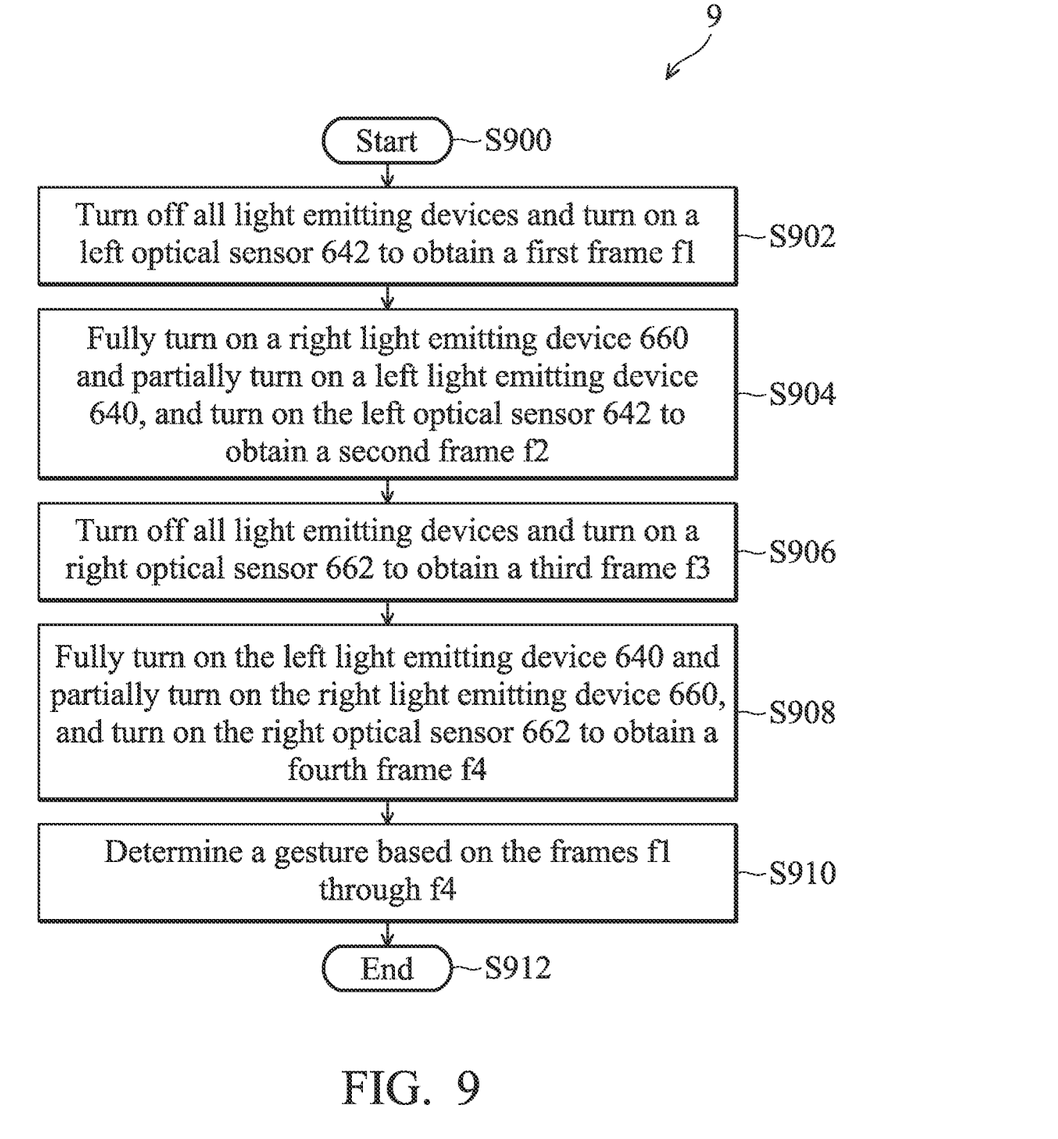
FIG. 9 is a flowchart of a gesture determination method 9 according to another embodiment of the invention.

FIG. 9 is a flowchart of a gesture determination method 9 according to another embodiment of the invention, adopted by the optical touch system 6 in FIG. 6.

When the optical touch control system 6 turns on, the controller 60 may load the program codes or initiate the circuits which implement the gesture determination method 8 to determine a user gesture (S900).

Initially, the controller 60 turns off all light-emitting devices and turns on the left optical sensor 642 to obtain a first frame f1 which contains image information observing the background and hand in the dark from the left (S902). The controller 60 then sets the right light-emitting device 660 to full brightness and the right light-emitting device 640 to dimmed brightness and turns on the left optical sensor 642 to obtain a second frame f2 which contains image information observing the background in the dark and hand in the light from the left (S904). The dimmed brightness of the right light-emitting device 640 refers to any brightness that is less or equal to 50% of the full brightness. When the right light-emitting device 660 is set to the full brightness, the left light-emitting device 640 provides an assistant light source to the fingers via a small current. For example, the right light-emitting device 660 is set to 100% brightness and the left light-emitting device 640 is set to 20% brightness. Then, the controller 60 may subtract the first frame f1 from the second frame f2 to retrieve image information from the left which removes the background in the dark and keeps the hand in the light.

Next, the controller 60 turns off all light-emitting devices and turns on the right optical sensor 662 to obtain a third frame f3 which contains image information observing the background and hand in the dark from the right (S906). The controller 60 then sets the left light-emitting device 640 to full brightness and the right light-emitting device 660 to dimmed brightness and turns on the right optical sensor 662 to obtain a fourth frame f4 which contains image information observing the background in the dark and hand in the light from the right (S908). The dimmed brightness of the right light-emitting device 660 refers to any brightness that is less or equal to 50% of the full brightness. When the left light-emitting device 640 is set to the full brightness, the right light-emitting device 660 provides an assistant light source to the fingers via a small current. For example, the left light-emitting device 640 is set to 100% brightness and the right light-emitting device 660 is set to 20% brightness. Then, the controller 60 may subtract the third frame f3 from the fourth frame f4 to retrieve image information from the right which removes the background in the dark and keeps the hand in the light.

Finally, the controller 60 determines the position and gesture of the hand based on the image information retrieved from the left and right calculated by the frames f1 through f4 (S910).

Although the embodiment in FIG. 9 retrieves the image information from the left then subsequently from the right to determine a gesture, in certain embodiments, the order of retrieving the image information may be firstly from the right then subsequently from the left. Moreover, in some embodiments, the steps of subtracting the first frame f1 from the second frame f2 and the third frame f3 from the fourth frame f4 to remove the backgrounds may be executed in Step S910. The gesture determination method 9 may be constantly and continuously run to determine gestures of a user when the optical touch system 6 turns on.

Figure 10:
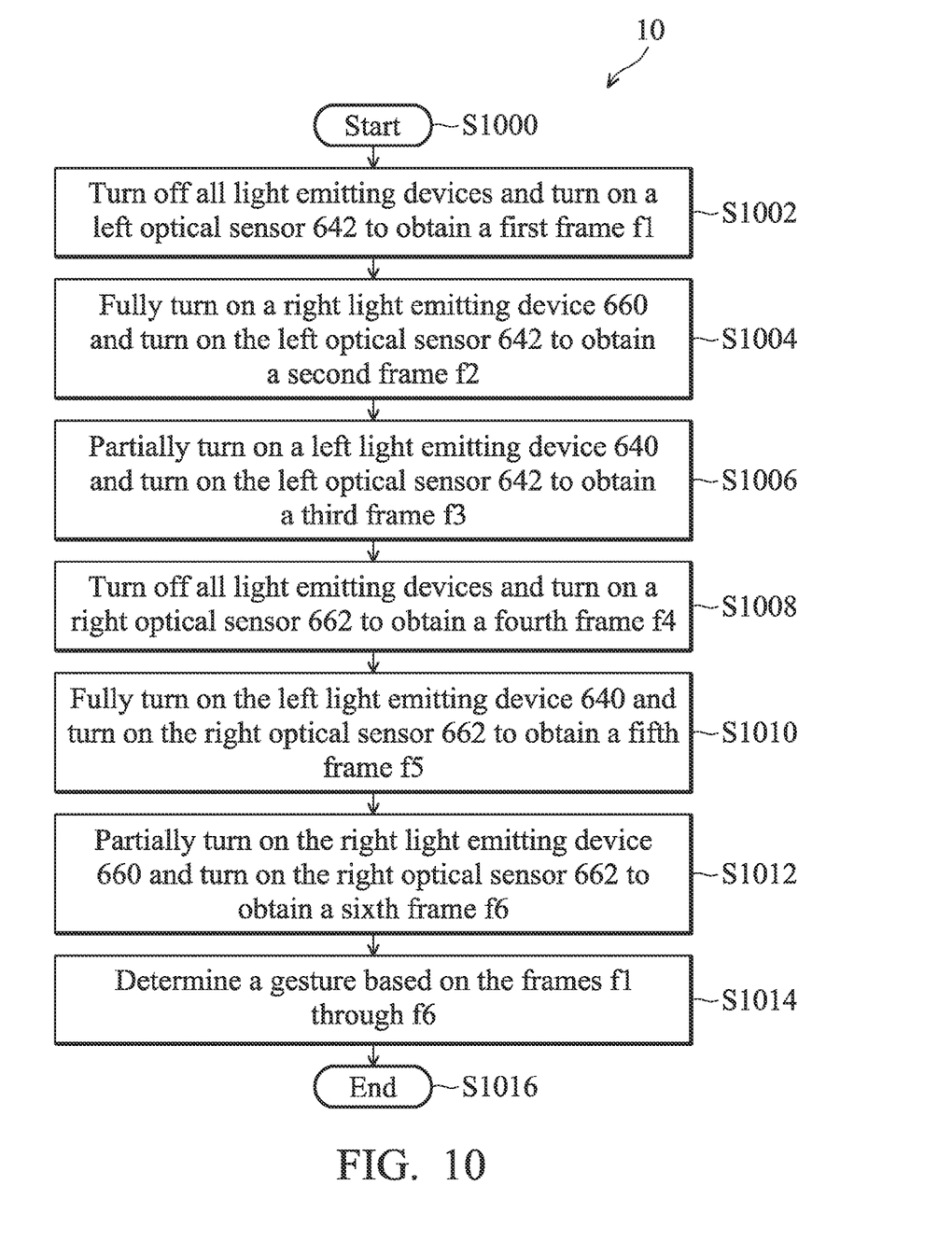
FIG. 10 is a flowchart of a gesture determination method 10 according to another embodiment of the invention.

FIG. 10 is a flowchart of a gesture determination method 10 according to another embodiment of the invention, adopted by the optical touch system 6 in FIG. 6. The gesture determination method 10 retrieves image frames by setting an opposite-side light-emitting device to full brightness and a same-side light-emitting device to dimmed brightness, so that when a hand is positioned far from an optical sensor, the opposite-side light-emitting device may serve as lighting for retrieving an image frame; whereas when the hand is positioned close to the optical sensor, the same-side light-emitting device may serve as lighting for retrieving the image frame. The display panel 62 may be evenly divided into 4 quadrants. When a hands falls into the 3 quadrants that is far from an optical sensor, an opposite-side light-emitting device may light up a hand and be prevented from lighting up the opposite environment object, consequently, the gesture determination method 10 determines to use the image frame retrieved by using the opposite-side light-emitting device to determine a gesture. On the contrary, when the hands falls into the 1 quadrant that is close to the optical sensor, an same-side light-emitting device may light up the hand with a dimmed brightness and be prevented from lighting up the opposite environment object, consequently, the gesture determination method 10 determines to use the image frame retrieved by using the same-side light-emitting device to determine a gesture.

When the optical touch control system 6 turns on, the controller 60 may load the program codes or initiate the circuits which implement the gesture determination method 8 to determine a user gesture (S1000).

Initially, the controller 60 turns off all light-emitting devices and turns on the left optical sensor 642 to obtain a first frame f1 which contains image information observing the background and hand in the dark from the left (S1002). The controller 60 then sets the right light-emitting device 660 to full brightness and turns on the left optical sensor 642 to obtain a second frame f2 which contains image information observing the background in the dark and hand in the light from the left (S1004), and sets the left light-emitting device 640 to dimmed brightness and turns on the left optical sensor 642 to obtain a third frame f3 which contains image information of the hand that is lightened up from a close range and detected from the left (S1006). The dimmed brightness of the right light-emitting device 640 refers to any brightness that is less or equal to 50% of the full brightness. The left light-emitting device 640 provides an assistant light source to fingers via a small current. For example, the right light-emitting device 660 uses 100% brightness and the left light-emitting device 640 uses 20% brightness for illumination. Then, the controller 60 may subtract the first frame f1 from the second frame f2 to retrieve first image information which removes the background in the dark and keeps the hand fully illuminated from the right and detected from the left, subtract the first frame f1 from the third frame f3 to retrieve second image information which removes the background in the dark and keeps the hand partially illuminated from the left and detected from the left, and determine a left gesture image output based on the first and second image information.

Table 1 shows the first image information (f2−f1) obtained by subtracting the first frame f1 from the second frame f2, the second image information (f3−f1) obtained by subtracting the first frame f1 from the third frame f3, and the left gesture image output determined based on the first image information (f2−f1) and the second image information (f3−f1). When neither the first image information (f2−f1) nor the second image information (f3−f1) can clearly show a gesture, the controller 60 will not output any left gesture image output. When the first image information (f2−f1) can and the second image information (f3−f1) cannot show a gesture, the controller 60 will output the first image information (f2−f1) as the left gesture image output. When the first image information (f2−f1) cannot and the second image information (f3−f1) can show a gesture, the controller 60 will output the second image information (f3−f1) as the left gesture image output. When both the first image information (f2−f1) and the second image information (f3−f1) can show a gesture, the controller 60 will output the first image information (f2−f1) as the left gesture image output.

TABLE 1

| f2 − f1 | f3 − f1 | Output |
|---------|---------|--------|
| X | X | X |
| ○ | X | f2 − f1 |
| X | ○ | f3 − f1 |
| ○ | ○ | f2 − f1 |

Next, the controller 60 turns off all light-emitting devices and turns on the right optical sensor 662 to obtain a fourth frame f4 which contains image information observing the background and hand in the dark from the right (S1008), then sets the left light-emitting device 640 to full brightness and turns on the right optical sensor 662 to obtain a fifth frame f5 which contains image information observing the background in the dark and hand in the light from the right (S1010), and sets the right light-emitting device 660 to dimmed brightness and turns on the right optical sensor 662 to obtain a sixth frame f6 which contains image information of the hand that is lightened up from a close range and detected from the right (S1012). The dimmed brightness of the right light-emitting device 660 refers to any brightness that is less or equal to 50% of the full brightness. The right light-emitting device 660 provides an assistant light source to fingers via a small current. For example, the left light-emitting device 640 uses 100% brightness and the right light-emitting device 660 uses 20% brightness for illumination. Then, the controller 60 may subtract the fourth frame f4 from the fifth frame f5 to retrieve third image information which removes the background in the dark and keeps the hand fully illuminated from the left and detected from the right, subtract the fourth frame f4 from the sixth frame f6 to retrieve fourth image information which removes the background in the dark and keeps the hand partially illuminated from the right and detected from the right, and determine a right gesture image output based on the third and fourth image information.

Table 2 shows the third image information (f5−f4) obtained by subtracting the fourth frame f4 from the fifth frame f5, the fourth image information (f6−f4) obtained by subtracting the fourth frame f4 from the sixth frame f6, and the right gesture image output determined based on the third image information (f5−f4) and the fourth image information (f6−f4). When neither the third image information (f5−f4) nor the fourth image information (f6−f4) can clearly show a gesture, the controller 60 will not output any right gesture image output. When the third image information (f5−f4) can and the fourth image information (f6−f4) cannot show a gesture, the controller 60 will output the third image information (f5−f4) as the right gesture image output. When the third image information (f5−f4) cannot and the fourth image information (f6−f4) can show a gesture, the controller 60 will output the fourth image information (f6−f4) as the right gesture image output. When both the third image information (f5−f4) and the fourth image information (f6−f4) can show a gesture, the controller 60 will output the third image information (f5−f4) as the right gesture image output.

TABLE 2

| f5 − f4 | f6 − f4 | Output |
|---------|---------|--------|
| X | X | X |
| ○ | X | f5 − f4 |
| X | ○ | f6 − f4 |
| ○ | ○ | f5 − f4 |

Finally, the controller 60 determines the position and gesture of the hand based on the left and right image information calculated by the frames f1 through f6 (S1014) and completes the gesture determination method 10 (S1016).

Although the embodiment in FIG. 10 retrieves the image information from the left then subsequently from the right to determine a gesture, in certain embodiments, the order of retrieving the image information may be firstly from the right then subsequently from the left. Moreover, in some embodiments, the steps of obtaining the first image information (f2−f1) and the second image information (f3−f1), and obtaining the third image information (f5−f4) and the fourth image information (f6−f4) may be executed in Step S1014. The gesture determination method 10 may be constantly and continuously run to determine gestures of a user when the optical touch system 6 turns on.

Figure 11:
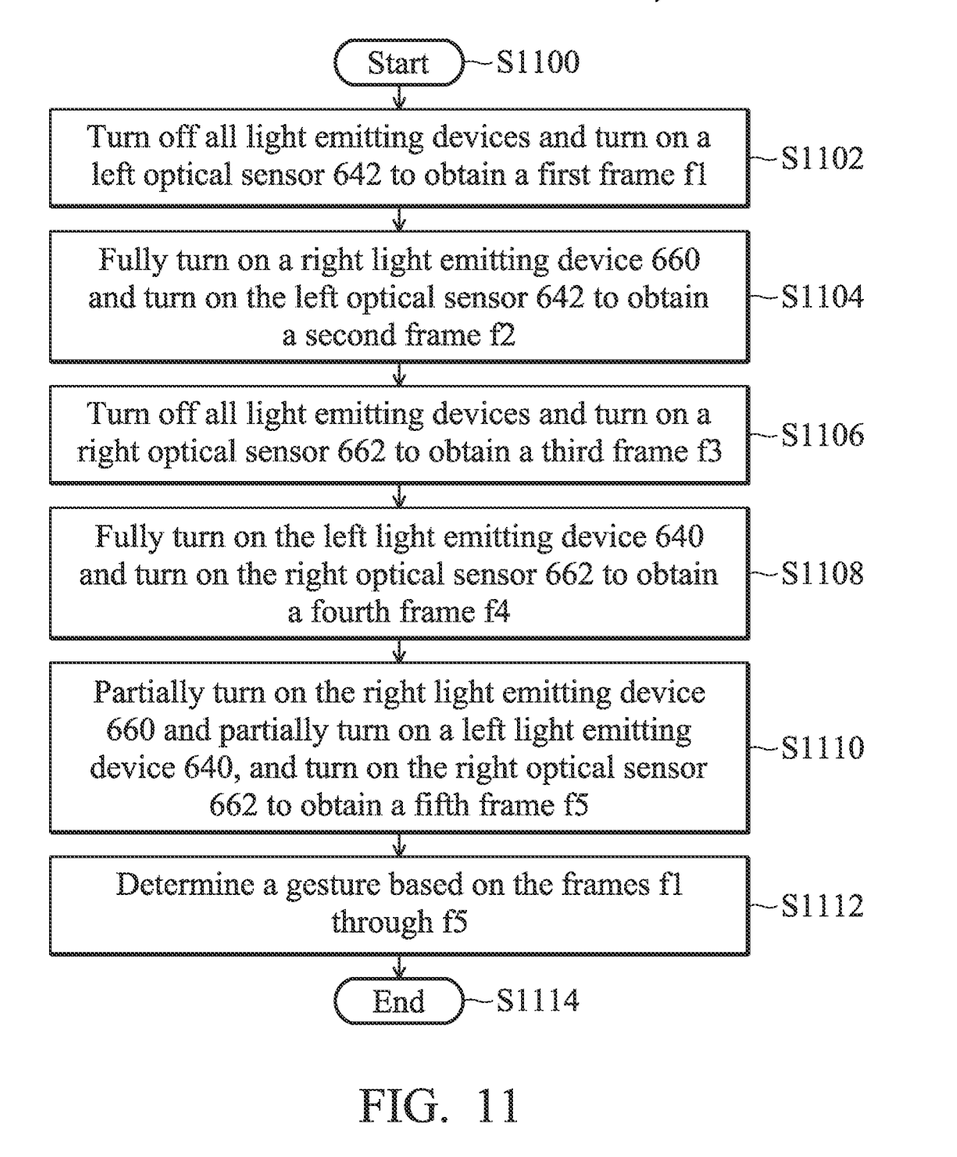
FIG. 11 is a flowchart of a gesture determination method 11 according to another embodiment of the invention.

FIG. 11 is a flowchart of a gesture determination method 11 according to another embodiment of the invention, adopted by the optical touch system 6 in FIG. 6. The gesture determination method 11 may be implemented by program codes or circuits.

The differences of the gesture determination methods 10 and 11 lie in that Step S1110 of the gesture determination method 11 is a combination of Steps S1006 and S1012 of the gesture determination method 10. In Step S1110, the right light-emitting device 660 and the left light-emitting device 640 are set to dimmed brightness, and the right optical sensor 662 is turned on to obtain a fifth frame f5. In the gesture determination methods 11, the controller 60 can subtract the first frame f1 from the second frame f2 to retrieve first image information (f2−f1) which removes the background in the dark and keeps the hand fully illuminated from the right and detected from the left, subtract the first frame f1 from the fifth frame f5 to retrieve second image information (f5−f1) which removes the background in the dark and keeps the hand partially illuminated from the left and detected from the left, and determine a left gesture image output based on the first and second image information. Next, the controller 60 can subtract the third frame f3 from the fourth frame f4 to retrieve first image information (f4−f3) which removes the background in the dark and keeps the hand fully illuminated from the left and detected from the right, subtract the first frame f1 from the fifth frame f5 to retrieve second image information (f5−f3) which removes the background in the dark and keeps the hand partially illuminated from the right and detected from the right, and determine a right gesture image output based on the third and fourth image information. Finally, the controller 60 can determine a gesture based on the left and right image information calculated by the frames f1 through f5 (S1112) and completes the gesture determination method 10 (S1114).

Although the embodiment in FIG. 11 retrieves the image information from the left then subsequently from the right to determine a gesture, in certain embodiments, the order of retrieving the image information may be firstly from the right then subsequently from the left. Moreover, in some embodiments, the steps of obtaining the first image information (f2−f1) and the second image information (f5−f1), and obtaining the third image information (f4−f3) and the fourth image information (f5−f3) may be executed in Step S1112. The gesture determination method 11 may be constantly and continuously run to determine gestures of a user when the optical touch system 6 turns on.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, processor, microprocessor or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical touch control system, comprising:
    a display panel;
    a first optical sensor, disposed at a first corner of the display panel;
    a first light-emitting device, disposed on the first optical sensor, and configured to emit a first light beam toward a first direction;
    a second optical sensor, disposed at a second corner of the display panel, wherein the second corner is opposite the first corner;
    a second light-emitting device, disposed on the second optical sensor, and configured to emit a second light beam toward a second direction; and
    a controller, configured to turn off the first and second light-emitting devices and turn on the first optical sensor to obtain a first frame, only turn on both the second light-emitting device and the first optical sensor to obtain a second frame, turn off the first and second light-emitting devices and turn on the second optical sensor to obtain a third frame, only turn on both the first light-emitting device and the second optical sensor to obtain a fourth frame, and determine a gesture according to the first, the second, the third, and the fourth frames.

2. The optical touch control system of claim 1, further comprising:
    an auxiliary light-emitting device, disposed at a center of an edge between the first and second corners of the display panel, configured to emit a third light beam toward a third direction;

wherein the controller is configured to only turn on the second light-emitting device and the auxiliary light-emitting device and turn on the first optical sensor to obtain the second frame, and only turn on the first light-emitting device and the auxiliary light-emitting device and turn on the second optical sensor to obtain the fourth frame.

3. The optical touch control system of claim 1, further comprising:
a plurality of auxiliary light-emitting devices, disposed evenly along an edge between the first and second corners of the display panel, configured to emit a plurality of auxiliary light beam toward a third direction;
wherein the controller is configured to only turn on the second light-emitting device and the plurality of auxiliary light-emitting devices and turn on the first optical sensor to obtain the second frame, and only turn on the first light-emitting device and the plurality of auxiliary light-emitting devices and turn on the second optical sensor to obtain the fourth frame.

4. The optical touch control system of claim 1, wherein the controller is configured to set the second light-emitting device to full brightness and the first light-emitting device to dimmed brightness and turn on the first optical sensor to obtain the second frame, and set the first light-emitting device to full brightness and the second light-emitting device to dimmed brightness and turn on the second optical sensor to obtain the fourth frame.

5. The optical touch control system of claim 1, wherein the controller is configured to set the first and second light-emitting devices to dimmed brightness, turn on the first or second optical sensor to obtain a fifth frame, and determine the gesture based on the first, the second, the third, the fourth, and the fifth frames.

6. The optical touch control system of claim 1, wherein the controller is configured to set the second light-emitting devices to dimmed brightness and turn on the first optical sensor to obtain a fifth frame, set the first light-emitting devices to dimmed brightness and turn on the second optical sensor to obtain a sixth frame, and determine the gesture based on the first, the second, the third, the fourth, the fifth, and the sixth frames.

* * * * *